United States Patent
Inuzuka et al.

(10) Patent No.: US 6,235,066 B1
(45) Date of Patent: May 22, 2001

(54) MANUFACTURE OF LITHIUM ION SECONDARY BATTERY

(75) Inventors: Takayuki Inuzuka; Yasuhiro Yoshida; Michio Murai; Kouji Hamano; Hisashi Shiota; Shigeru Aihara; Sho Shiraga, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/355,984
(22) PCT Filed: Dec. 22, 1997
(86) PCT No.: PCT/JP97/04749
  § 371 Date: Aug. 23, 1999
  § 102(e) Date: Aug. 23, 1999
(87) PCT Pub. No.: WO99/33135
  PCT Pub. Date: Jul. 1, 1999

(51) Int. Cl.$^7$ .................................................. H01M 10/40
(52) U.S. Cl. ........................................ 29/623.5; 29/623.4
(58) Field of Search ................................. 29/623.5, 623.4

(56) References Cited

U.S. PATENT DOCUMENTS

| 5,456,000 | * | 10/1995 | Gozdz et al. | ............... | 29/623.2 |
| 5,571,634 | * | 11/1996 | Gozdz et al. | ............... | 429/224 |

FOREIGN PATENT DOCUMENTS

| 62-8471   | * | 1/1987  | (JP). |
| 9-500485  | * | 1/1997  | (JP). |
| 9-293518  | * | 11/1997 | (JP). |

* cited by examiner

*Primary Examiner*—Laura Weiner
(74) *Attorney, Agent, or Firm*—Oblon, Spivak, McClelland, Maier & Neustadt, P.C.

(57) ABSTRACT

An object is to provide a process for producing a compact lithium ion secondary battery which exhibits high and stable performance and can take an arbitrary shape such as a thin shape. A process for producing a battery comprised of a positive electrode (1), a negative electrode (4), a separator (7) and an electrolytic solution comprises applying a binder resin solution mainly comprising a fluorocarbon resin or polyvinyl alcohol to a separator (7), laying a positive electrode (1) and a negative electrode (4) alternately on the separator (7) to form a laminated battery body having a plurality of laminates (12), drying the laminated battery body under pressure to form a tabular laminated battery body, and impregnating the tabular laminated battery body with an electrolytic solution.

12 Claims, 3 Drawing Sheets

MANUFACTURE OF LITHIUM ION SECONDARY BATTERY

TECHNICAL FIELD

This invention relates to a process for producing a lithium ion secondary battery. More particularly, it relates to a process for producing a lithium ion secondary battery having an arbitrary shape with a reduced thickness and a reduced weight.

BACKGROUND OF THE INVENTION

In order to meet the demand for reduction in size and weight of portable electronic equipment, increase of capacity of the battery used therefor is deemed the most important subject for improving battery performance. Development and improvement of a variety of batteries have been proceeding along this line. Of the batteries developed to date, lithium ion secondary batteries are expected to achieve the highest capacity and have been and will be given intense improvement.

A lithium ion secondary battery mainly comprises a positive electrode, a negative electrode, and an ion conducting layer interposed between the electrodes. The ion conducting layer used in a lithium ion secondary battery now available for practical use is a separator made of a porous film of polypropylene, etc. filled with an electrolytic solution.

In the lithium ion secondary batteries now available for practical use, electrical connections among the positive electrode, the ion conducting layer, and the negative electrode are maintained by pressure application by using a firm battery case made of stainless steel, etc. However, such a case increases the weight of a lithium ion secondary battery, making it difficult to realize size and weight reduction. Moreover, the rigidness of the case narrows the freedom of shape design.

In order to realize size and weight reduction and freedom of shape design of a lithium ion secondary battery, it is necessary to join an ion conducting layer to a positive and a negative electrode and to maintain the joined state without applying pressure from the outside.

In this connection, U.S. Pat. No. 5,437,692 discloses a structure in which a lithium ion-conducting polymer is used as an ion conducting layer, and a positive electrode and a negative electrode are joined to the ion-conducting layer with an adhesive layer containing a lithium compound. WO95/15589 discloses a structure having a plastic ion-conducting layer to which a positive and a negative electrode are joined.

According to the method disclosed in U.S. Pat. No. 5,437,692 supra, however, the joint strength attained is not enough, the battery cannot be made sufficiently thin, and the ion conduction resistance between the positive and the negative electrodes through the ion-conducting layer is high so that the battery characteristics such as charge and discharge characteristics are insufficient for practical use. According to WO95/15589 supra, the ion-conducting layer, being plastic, cannot secure sufficient joint strength, and the thickness of the battery cannot be reduced sufficiently.

The present invention has been made in order to solve these problems. It provides a process for producing a lithium ion secondary battery in which a positive and a negative electrode are brought into intimate contact with an ion-conducting layer (a separator) with an adhesive resin to secure sufficient joint strength among the electrodes and the separator while suppressing ion conduction resistance among them on the same level as in a conventional battery put in a case.

DISCLOSURE OF THE INVENTION

A first process for producing a lithium ion secondary battery according to the present invention comprises the steps of forming a positive electrode active material-layer and a negative electrode active material layer on a positive electrode current collector or a negative electrode current collector, respectively, to prepare a positive electrode and a negative electrode, respectively, applying to a separator a binder resin solution having a fluorocarbon resin or polyvinyl alcohol as a main component dissolved in a solvent, forming a plurality of laminates in which the positive electrode and the negative electrode alternate with the separator therebetween, drying the plurality of laminates while applying pressure to evaporate the solvent to form a tabular laminated battery body, and impregnating the tabular laminated battery body with an electrolytic solution.

A second process for producing a lithium ion secondary battery of the invention is the above-described first process, wherein the plurality of laminates are formed via a cut sheet of the separator.

A third process for producing a lithium ion secondary battery of the invention is the above-described first process, wherein the plurality of laminates are formed via a rolled separator.

A fourth process for producing a lithium ion secondary battery of the invention is the above-described first process, wherein the plurality of laminates are formed via a folded separator.

According to the first to fourth processes for producing a lithium ion secondary battery, separation between a separator and each electrode composed of a positive or negative electrode active material and a positive or negative electrode current collector joined to the respective active material is prevented, and the battery structure can be maintained without a rigid case. This makes it feasible to reduce the weight and thickness of a battery. The binder resin solution applied to the separators brings about improved charge and discharge characteristics. While having a plurality of laminates, a compact lithium ion secondary battery with stable characteristics can be obtained. In case some outer force that would deform the battery or some internal thermal stress is imposed, the laminate is destroyed not at the interface between the separator and the electrode but at the interface between the active material layer and the current collector, which is effective for safety security.

A fifth process for producing a lithium ion secondary battery of the invention is the above-described first process, wherein the binder resin solution is a solution containing a fluorocarbon resin or polyvinyl alcohol in dimethylformamide.

A sixth process for producing a lithium ion secondary battery of the invention is the above-described fifth process, wherein the binder resin solution is a solution containing 3 to 25 parts by weight, preferably 5 to 15 parts by weight, of the fluorocarbon resin or polyvinyl alcohol in dimethylformamide. According to this embodiment, the time required for the step of evaporating the solvent is shortened, and a lithium ion secondary battery having excellent charge and discharge characteristics can be obtained.

A seventh process for producing a lithium ion secondary battery of the invention is the above-described first process, wherein the step of drying is carried out in a flow of air at 80° C. or lower, whereby the time required for drying can be shortened.

An eighth process for producing a lithium ion secondary battery of the invention is the above-described first process, wherein the surface of the separators is subjected to a plasm treatment before the binder resin solution is applied thereto, whereby the adhesion can be improved further.

BEST MODE FOR CARRYING OUT THE INVENTION

The practice in carrying out the present invention will be described by referring to the accompanying drawings.

Figure 1:
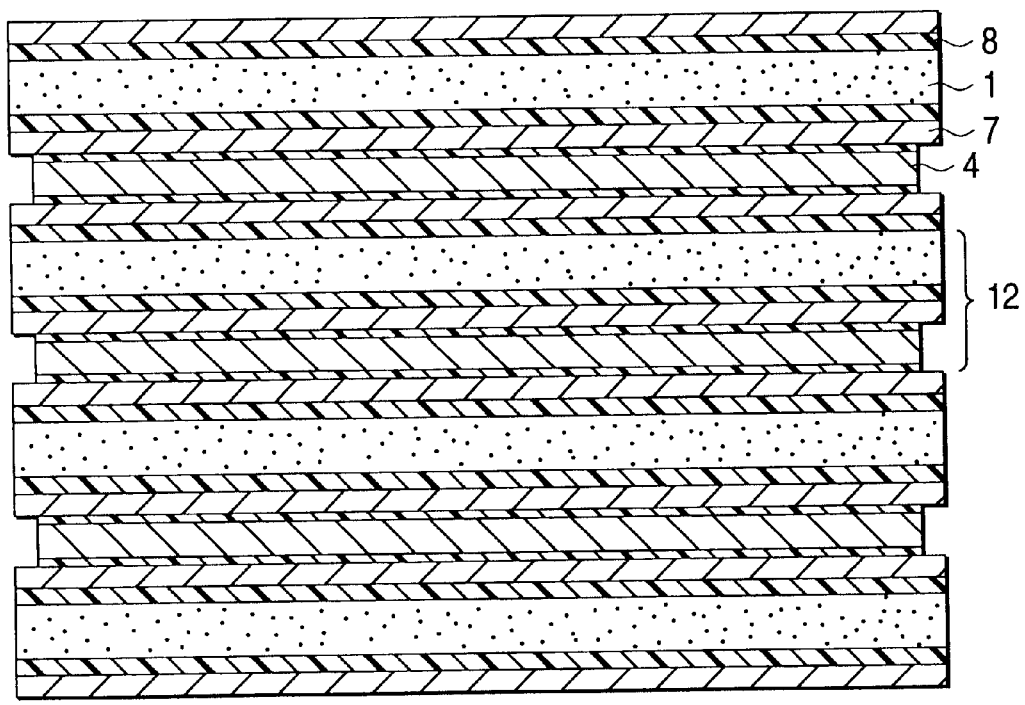
FIGS. 1, 2, and 3 are each a schematic cross section showing the main part of the lithium ion secondary battery according to an embodiment of the present invention, which is obtained by the process of the invention.
Figure 2:
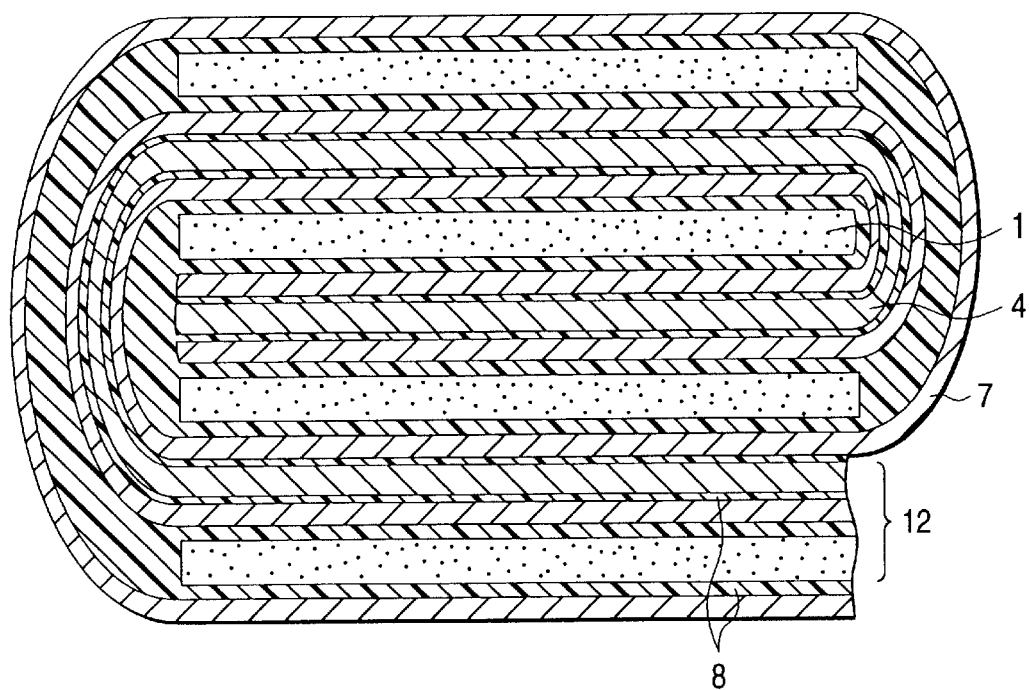
Figure 3:
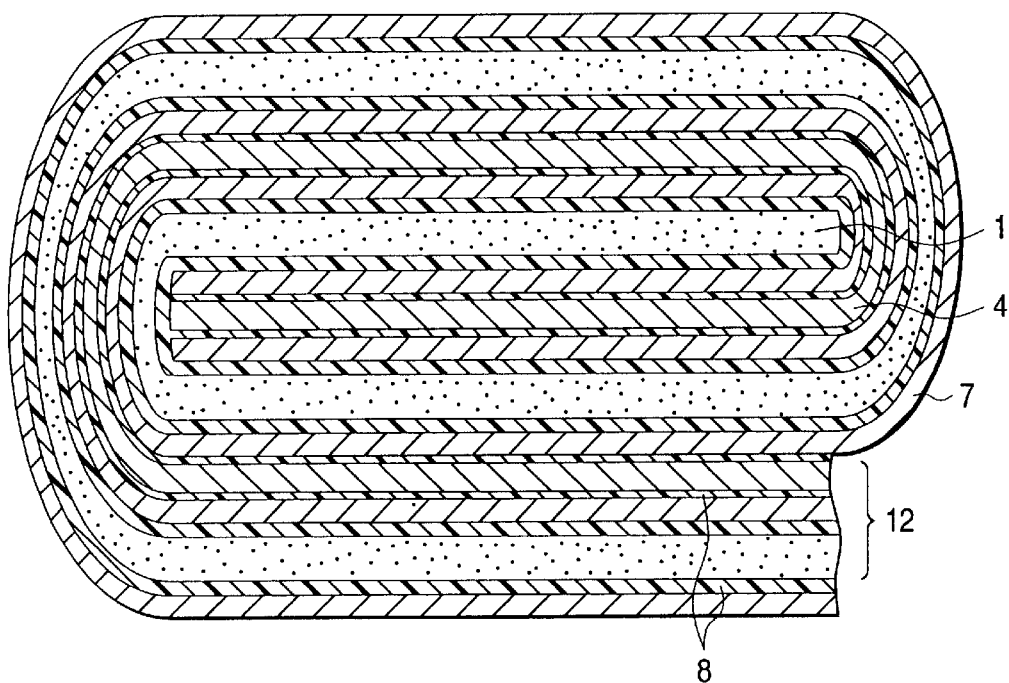
Figure 4:
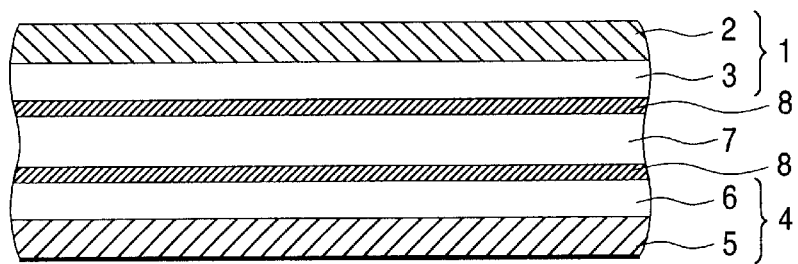
FIG. 4 is a schematic cross section illustrating the structure of the unit laminate shown in FIGS. 1, 2 and 3.

FIGS. 1 through 3 each show a schematic cross section of the main part of the lithium ion secondary battery according to an embodiment of the invention, which is obtained by the process of the invention. FIG. 4 is a schematic cross section illustrating the structure of the unit laminate shown in FIGS. 1 through 3. In these Figures, numeral 12 indicates a laminate. The laminate 12 is made up of a positive electrode 1 comprising a positive electrode current collector 2 made of metal, e.g., aluminum foil, having formed thereon a positive electrode active material layer 3; a negative electrode 4 comprising a negative electrode current collector 5 made of metal, e.g., copper, having formed thereon a negative electrode active material layer 6; a separator 7 holding an electrolytic solution containing lithium ions; and binder resin layers 8 which join the positive electrode 1 and the negative electrode 4 to the separator 7. The binder resin layers 8 have fine pores in which an electrolytic solution is held.

Any metal stable within a lithium ion secondary battery can be used as a positive electrode current collector 2 and a negative electrode current collector 5. Aluminum is preferred as a positive electrode current collector 2, and copper is preferred as a negative electrode current collector 5. The current collectors 2 and 5 may have any form, such as foil, net or expanded metal. Those presenting a large surface area, such as net and expanded metal, are preferred for obtaining joint strength to the active material layers 3 and 6 and for facilitating impregnation with an electrolytic solution after joining.

While not particularly limiting, the active material which can be used in the positive electrode active material layer 3 includes complex oxides of lithium and a transition metal, such as cobalt, manganese or nickel; complex oxides of lithium and a chalcogen compound; complex oxides containing lithium, a chalcogen compound, and a transition metal; and these complex oxides to which various dopant elements have been added.

Any active material can be used in the negative electrode active material layer 6 irrespective of the chemical characteristics, form, and the like, while carbonaceous materials are preferably used.

Any insulating material that can be impregnated with an electrolytic solution and has sufficient strength, such as porous film, net, and nonwoven fabric, can be used as a separator 7. A porous film of polyethylene, polypropylene, etc. is preferred for adhesiveness and safety.

The binder resin which forms the binder resin layer 8 includes, for example, a fluorocarbon resin, a mixture mainly comprising a fluorocarbon resin, polyvinyl alcohol, and a mixture mainly comprising polyvinyl alcohol. Specific examples of useful fluorocarbon resins include polymers or copolymers containing a fluorine atom in the molecular structure thereof, e.g., vinylidene fluoride or tetrafluoroethylene, polymers or copolymers having vinyl alcohol in the molecular skeleton thereof, and their mixtures with polymethyl methacrylate, polystyrene, polyethylene, polypropylene, polyvinylidene chloride, polyvinyl chloride, polyacrylonitrile, polyethylene oxide, and so forth. Polyvinylidene fluoride, which is a fluorocarbon resin, is particularly suitable.

The solvent which can be used for forming the binder resin layer 8 includes highly polar solvents, such as N-methylpyrrolidone, N,N'-dimethylformamide, and dimethyl sulfoxide. From the standpoint of safety, N-methylpyrrolidone is particularly suited.

The electrolytic solution which can be used includes a solution of an electrolyte, such as $LiPF_6$, $LiClO_4$, $LiBF_4$, $LiCF_3SO_3$, $LiN(CF_3SO_2)_2$ or $LiC(CF_3SO_2)_3$, in an ether solvent, such as dimethoxyethane, diethoxyethane, dimethyl ether or diethyl ether, an ester solvent, such as ethylene carbonate or propylene carbonate, or a mixture thereof.

The process for producing the lithium ion secondary battery shown in FIG. 1 will be explained.

Each of the active materials of the positive electrode 1 and the negative electrode 4 is mixed with an appropriate amount of a binder resin (the active material of the positive electrode 1 is further mixed with a conductive material, such as graphite powder) to prepare paste. The pasty active materials are applied to the positive electrode current collector 2 and the negative electrode current collector 5, respectively, and dried to form the positive electrode 1 and the negative electrode 4, respectively. The binder resin used here is selected from those having the same main component as used in the binder resin layers 8 and other various resins such as polyethylene.

The above-mentioned binder resin solution is then uniformly applied to the entire surface of the separator 7 by, for example, a dip coating method in which the separator 7 is dipped in the binder resin solution and pulled out, a bar coating method in which the binder resin is dropped on the separator 7 and uniformly spread with a bar coater, and a spray coating method comprising spraying the binder resin onto the separator. Where a fluorocarbon resin is used as a separator, the surface of the separator can be subjected to a plasma treatment to secure adhesiveness.

If the binder resin solution is applied not to the separator but to the electrode, it would penetrate into the electrode to reduce the adhesive strength between the separator and the electrode. Further, the binder resin solution having penetrated into the electrode hinders the passage of lithium ions, resulting in reduction of battery characteristics. Furthermore, where the binder resin used for electrode formation contains polyvinylidene fluoride or polyvinyl alcohol as a component, it will dissolve in the applied binder resin solution to reduce the strength of the electrode.

As far as the binder resin solution is applied to the separators, the binder resin is prevented from penetrating into the electrode and dissolving the binder resin for electrode formation, thereby securing adhesion between the separator and the electrode and suppressing reduction of electrode strength.

The binder resin layer properly formed in the interface between the separator and the electrode brings about improved utilization of the active material in intercalating and disintercalating lithium ions within an electrode. That is, since mobility of lithium ions is equal throughout an electrolytic solution, there is a problem that intercalation and disintercalation of lithium ions take place preferentially in the portion of the active material layer in the vicinity of the separator so that the active material in the inside of the electrode is not made effective use of. In the present invention, on the other hand, the active material in contact with the separator has less active sites than that in the inside of the electrode because it is covered with the binder resin solution applied to the separator. As a result, the active material in the vicinities of the separator and that in the inside of the electrode are equalized in rate of intercalation and disintercalation, leading to improved charge and discharge efficiency.

As a binder resin solution, an N-methylpyrrolidone solution containing 3 to 25 parts by weight, particularly 5 to 15 parts by weight, of polyvinylidene fluoride or polyvinyl alcohol as a main component is preferred. Too thin a binder resin solution fails to afford a sufficient amount of the resin, resulting in insufficient adhesive strength. Too thick a solution gives too much an amount of the resin, which will reduce the ion conductivity between electrodes, failing to secure satisfactory battery characteristics.

Before the applied binder resin solution dries, one of the electrodes is sandwiched in between a pair of separators with the coated sides inward. The resulting laminate is dried by heating while applying pressure to both sides of the laminate by means of a pressure roller, etc. The laminate is cut to sheets of prescribed size. The binder resin solution is applied to the outer surface of one of the separators having the electrode therebetween, and a piece of the other electrode having a prescribed size is stuck thereto. Subsequently, another pair of separators having one of the electrodes sandwiched therebetween and having the binder resin solution applied to the outer surface of one of them is laid on the other electrode previously stuck on the laminate. These steps are repeated to prepare a plurality of laminates. The plurality of laminates are dried by heating under pressure to form a tabular laminated battery body. The heating temperature is preferably 60 to 100° C. At temperatures lower than 60° C, drying takes much time, which is unfavorable from the standpoint of process management. At temperatures above 100° C, adverse influences can be given to the separators, etc. In some cases, heating should be continued further to remove any residual solvent. In such cases, pressure application is not particularly required. While not essential, pressure reduction during heating is effective in reducing the drying time.

The thus formed tabular laminated battery body made up of a plurality of laminates each composed of the separator 7 having the positive electrode I and the negative electrode 4 adhered thereto is put in an aluminum laminate film pack and impregnated with the above-described electrolytic solution under reduced pressure, and the aluminum laminate film pack is heat-sealed to complete a lithium ion secondary battery.

It has now been made possible to prevent separation between the separator and each electrode composed of the positive or negative electrode active material and the positive or negative electrode current collector joined to the respective active material. Therefore, the structure as a battery can be maintained without a rigid housing. This makes it feasible to produce a more compact, lighter and thinner battery which exhibits satisfactory charge and discharge characteristics and stable characteristics owing to the binder resin solution applied to the separators. In addition, where some outer force that might deform the battery or some internal thermal stress is imposed, breakage occurs not at the interface between the separator and the electrode but at the interface between the active material layer and the current collector, which is effective for safety security.

Where dimethylformamide which is capable of dissolving the binder resin mainly comprising a fluorocarbon resin, e.g., polyvinylidene fluoride, or polyvinyl alcohol and has a lower boiling point than N-methylpyrrolidone (boiling point: 202° C.) is used as a solvent of the binder resin solution, the time required for evaporating the solvent can be reduced. The content of the binder resin mainly comprising polyvinylidene fluoride or polyvinyl alcohol in dimethylformamide ranges from 3 to 25 parts by weight, preferably 5 to 15 parts by weight.

Where heat drying of the plurality of laminates prepared by laying up electrodes with a binder resin solution-coated separator therebetween is carried out by exposure to a flow of air at 80° C. or lower, the time required for drying can be reduced.

The present invention will now be illustrated in greater detail with reference to Examples inclusive of the embodiments shown in FIGS. 2 and 3.

EXAMPLE 1

Preparation of Positive Electrode:

Eighty-seven parts by weight of $LiCoO_2$, 8 parts by-weight of graphite powder, and 5 parts of polyvinylidene fluoride were dispersed in N-methylpyrrolidone (hereinafter abbreviated as NMP) to prepare positive electrode active material paste. The paste was applied with a doctor blade to a coating thickness of 300 $\mu$m to form a positive electrode active material film. A 30 $\mu$m thick aluminum net as a positive electrode current collector 2 was placed thereon, and the positive electrode active material paste was again spread on the net with a doctor blade to a thickness of 300 $\mu$m. The double-coated aluminum net was allowed to stand in a drier kept at 60° C. for 60 minutes to make the paste half-dried. The resulting laminate composed of the positive electrode current collector 2 and the positive electrode active material was rolled to a thickness of 400 $\mu$m to prepare a positive electrode 1 having positive electrode active material layers 3. The positive electrode 1 was immersed in an electrolytic solution. The peel strength between the positive electrode active material layer 3 and the positive electrode current collector 2 measured after the immersion was found to be 20 to 25 gf/cm.

Preparation of Negative Electrode:

Ninety-five parts by weight of Mesophase Microbead Carbon (a trade name, produced by Osaka Gas Co., Ltd.) and 5 parts by weight of polyvinylidene fluoride were dispersed in NMP to prepare negative electrode active material paste. The paste was applied with a doctor blade to a thickness of 300 $\mu$m to make a negative electrode active material film. A 20 $\mu$m thick copper net of band form as. a negative electrode current collector was placed-thereon, and the negative electrode active material paste was again spread thereon with a doctor blade to a thickness of 300 $\mu$m. The laminate was allowed to stand in a drier at 60° C. for 60 minutes to make the paste half-dried. The resulting laminate composed of the negative electrode current collector 5 and the negative electrode active material was rolled to a thickness of 400 $\mu$m to prepare a negative electrode 4 having negative electrode active material layers 6.

The negative electrode 4 was immersed in an electrolytic solution. The peel strength between the negative electrode active material layer 6 and the negative electrode current collector 5 measured after the immersion was found to be 5 to 10 gf/cm.

Preparation of Battery:

Five parts by weight of polyvinylidene fluoride and 95 parts by weight of NMP were mixed and thoroughly stirred to prepare a uniform binder resin solution.

The binder resin solution thus prepared was dropped on a side each of two porous polypropylene sheets (Cellguard #2400, produced by Hoechest) of continuous band form used as a pair of separators 7 and uniformly spread over the entire surface of the separators by rolling with a bar coater having a filament of 0.5 mm in diameter wound tightly around a glass tube of 1 cm in diameter.

Before the binder resin dried, the positive electrode 1 as one of electrodes was sandwiched in between the coated sides of the separators in intimate contact, and the laminate was dried by heating while applying pressure from both sides with a pressure roller, etc. and cut to pieces of a length. The binder resin solution was applied to one side of a cut piece of the paired polypropylene sheets with a bar coater in the same manner as above, and the negative electrode 4 cut to a prescribed size as the other electrode was stuck thereto. The binder resin solution was then applied to a side of another cut piece of the paired polypropylene sheets having the positive electrode therebetween, and the coated side was stuck to the negative electrode of the laminate. These steps were repeated to build up a laminate body having a plurality of laminates. The laminate body was heated in still air at 60° C. in a drier while applying pressure to evaporate the NMP solvent to prepare a tabular laminated battery body as shown in FIG. 1. On NMP's evaporating, the binder resin became a porous film with open cells.

Subsequently, the tabular laminated battery body having a prescribed size was put in an aluminum laminated film pack and impregnated with an electrolytic solution prepared by dissolving $LiPF_6$ (produced by Tokyo Kasei) in a 1:1 (by mole) mixed solvent of ethylene carbonate (produced by Kanto Chemical) and 1,2-dimethoxyethane (produced by Wako Pure Chemical) in a concentration of 1.0 $mol/dm^3$ under reduced pressure. The opening of the pack was heat-sealed to complete a lithium ion secondary battery having the laminated battery body shown in FIG. 1

EXAMPLE 2

A lithium ion secondary battery having the laminated battery body shown in FIG. 1 was prepared in the same manner as in Example 1, except for changing the binder resin solution as described below.

A mixture of 5 parts by weight of polyvinyl alcohol and 95 parts by weight of NMP was thoroughly stirred to prepare a uniform binder resin solution.

EXAMPLE 3

A lithium ion secondary battery having the tabular laminated battery body shown in FIG. 1 was prepared in the same manner as in Example 1, except for replacing NMP used as a solvent of the binder resin solution in Examples 1 and 2 with dimethylformamide. In Example 3, the time required for evaporating the solvent was shorter than in Example 1.

EXAMPLE 4

A lithium ion secondary battery was prepared in the same manner as in Example 1, except that NMP used as a solvent of the binder resin solution in Examples 1 and 2 was replaced with dimethylformamide and that the step of evaporating the solvent was carried out by exposure to a flow of air at 60° C. In Example 4, the time required for evaporating the solvent was shorter than in Examples 1, 2 and 3.

The peel strength of the lithium ion secondary batteries obtained in Examples 1 to 4 was measured. The adhesive strength between the positive electrode 1 and the separator 7 and that between the negative electrode 4 and the separator 7 were 23 gf/cm and 12 gf/cm, respectively, which were higher than the adhesive strength between the active material layers 3 and 6 and the current collectors 2 and 5, respectively.

EXAMPLE 5

While Example 1 has shown a tabular laminated battery body having a plurality of laminates formed by using cut pieces of separators, a lithium ion secondary battery having the laminated battery body shown in FIG. 2 was prepared in Example 5 in the same manner as in Example 1, except that the tabular laminated battery body having a plurality of laminates was formed using rolled separators.

Preparation of Battery:

The binder resin solution was applied to a side of two porous polypropylene sheets (Cellguard #2400, produced by Hoechest) as a pair of separators 7 of band form. The negative electrode 4 (or positive electrode) of band form was sandwiched and stuck between the two separators with their coated sides inward, and the laminate was heated to dry with pressure applied.

The binder resin solution was then applied to one of the paired separators 7 of band form having the negative electrode 4 (or positive electrode) therebetween. One end of the coated separator 7 was folded back at a prescribed length while inserting the positive electrode 1 (or negative electrode) into the fold, and the laminate was passed through a laminator. Subsequently, the binder resin solution was applied to the other separator 7 of band form, and another piece of the positive electrode 1 (or negative electrode) was stuck thereto at the position corresponding to the positive electrode 1 (or negative electrode) having been inserted into the fold. The paired separators were rolled upto make an oblong ellipsoid. The separators were again rolled up with a still another cut piece of the positive electrode (or negative electrode) inserted therein. These steps were repeated to form a laminate body having a plurality of laminates. The laminate body was dried while applying pressure to obtain a tabular laminated battery body as shown in FIG. 2.

While Example 5 has shown an embodiment in which a pair of separators 7 are rolled up, the battery body may be such that is prepared by repeating a step of folding a pair of separator bands having a negative electrode 4 (or positive electrode) joined therebetween while sticking a cut piece of a positive electrode 1 (or negative electrode) into each fold.

EXAMPLE 6

A lithium ion secondary battery having the tabular laminated battery body shown in FIG. 3 was prepared in the same manner as in Examples 1 and 5, except that the separator band, the positive electrode band, and the negative electrode band were rolled up simultaneously.

Preparation of Battery:

The negative electrode 4 (or positive electrode) of band form was set between a pair of porous polypropylene sheets (Cellguard #2400, produced by Hoechest) as separators 7 of band form, and the positive electrode 1 (or negative electrode) of band form was placed on the outer side of one of the separators 7 with a prescribed length of its starting end sticking out over the end of that separator 7. The binder resin was applied to the inner sides of the paired separators 7 and the outer side of the separator 7 on which the positive electrode (ornegativeelectrode) had been arranged. The positive electrode 1 (or negative electrode), the two separators 7, and the negative electrode 4 (or positive electrode) were stuck together and passed through a laminator. The binder resin was applied to the outer side of the other separator 7, and the sticking end of the positive electrode 1 (or negative electrode) was folded back and stuck to the coated side of the separator 7. The laminate was rolled up in such a manner that the folded positive electrode 1 (or negative electrode) might be wrapped in, making an oblong ellipsoid, to form a laminate body having a plurality of laminates. The laminate body was dried while applying pressure to prepare a tabular laminated battery body.

The battery characteristics of the lithium ion secondary batteries obtained in Example 1 to 6 were evaluated. As a result, a weight energy density of 100 Wh/kg was obtained. The charge capacity even after 200 charge and discharge cycles at a current of C/2 was 75% of the initial one.

Industrial Applicability

The present invention provides batteries which can have reduced size and weight and an arbitrary shape as well as improved performance and can be used in portable electronic equipment, such as portable personal computers and cellular phones.

What is claimed is:

1. A process for producing a lithium ion secondary battery characterized by comprising the steps of forming a positive electrode active material layer and a negative electrode active material layer on a positive electrode current collector or a negative electrode current collector, respectively, to prepare a positive electrode and a negative electrode, respectively, applying to separators a binder resin solution having a fluorocarbon resin or polyvinyl alcohol as a main component dissolved in a solvent, interposing the positive electrode and the negative electrode alternately among the separators to form a plurality of laminates each composed of the positive electrode and the negative electrode, and the separator, drying the plurality of laminates while applying pressure to evaporate the solvent to form a tabular laminated electrode body, and impregnating the tabular laminated electrode body with an electrolytic solution.

2. A process for producing a lithium ion secondary battery according to claim 1, characterized in that the plurality of laminates are formed via a cut sheet of the separator.

3. A process for producing a lithium ion secondary battery according to claim 1, characterized in that the plurality of laminates are formed via a rolled separator.

4. A process for producing a lithium ion secondary battery according to claim 1, characterized in that the plurality of laminates are formed via a folded separator.

5. A process for producing a lithium ion secondary battery according to claim 1, characterized in that the binder resin solution is a solution containing a fluorocarbon resin or polyvinyl alcohol in dimethylformamide.

6. A process for producing a lithium ion secondary battery according to claim 5, characterized in that the binder resin solution is a solution containing 3 to 25 parts by weight of the fluorocarbon resin or polyvinyl alcohol in dimethylformamide.

7. A process for producing a lithium ion secondary battery according to claim 1, characterized in that the step of drying is carried out in a flow of air at 80° C. or lower.

8. A process for producing a lithium ion secondary battery according to claim 1, characterized in that the surface of the separators is subjected to a plasma treatment before the binder resin solution is applied thereto.

9. A process for producing a lithium ion secondary battery according to claim 5, characterized in that the binder resin solution is a solution containing 5 to 15 parts by weight of the fluorocarbon resin or polyvinyl alcohol in dimethylformamide.

10. A process for producing a lithium ion secondary battery according to claim 1, wherein the step of impregnating further comprises a step of drying the laminated body while heating.

11. A process for producing a lithium ion secondary battery according to claim 1, further comprising the step of covering the laminated electrode body into a flexible package and the step of sealing the flexible package.

12. A process for producing a lithium ion secondary battery according to claim 11, wherein the flexible package is made of resin laminated aluminum and, the step of sealing the flexible package comprises a step of heat-pressing.

* * * * *